US008199641B1

(12) United States Patent
Jagannathan et al.

(10) Patent No.: US 8,199,641 B1
(45) Date of Patent: Jun. 12, 2012

(54) PARALLEL DISTRIBUTED NETWORK MONITORING

(75) Inventors: Rangaswamy Jagannathan, Sunnyvale, CA (US); Rosanna Lee, Palo Alto, CA (US); Derek Sanders, Saratoga, CA (US); Xiaohong Pan, Fremont, CA (US); Kishor Kakatkar, Santa Clara, CA (US)

(73) Assignee: Xangati, Inc., Cupertino, CA (US)

( * ) Notice: Subject to any disclaimer, the term of this patent is extended or adjusted under 35 U.S.C. 154(b) by 64 days.

(21) Appl. No.: 12/179,703

(22) Filed: Jul. 25, 2008

Related U.S. Application Data

(60) Provisional application No. 60/962,181, filed on Jul. 25, 2007, provisional application No. 60/962,295, filed on Jul. 25, 2007, provisional application No. 60/962,182, filed on Jul. 25, 2007.

(51) Int. Cl.
*H04L 12/26* (2006.01)
*G06F 15/173* (2006.01)
(52) U.S. Cl. ........................................ 370/229; 709/224
(58) Field of Classification Search .................. None
See application file for complete search history.

(56) References Cited

U.S. PATENT DOCUMENTS 5,128,871 A 7/1992 Schmitz
(Continued)

OTHER PUBLICATIONS

Deering et al. "RFC1883," Internet Protocol Specification, Dec. 1995, pp. 1-27, ver. 6, <http://www.faqs.org/rfcs/rfc1883.html>.

(Continued)

*Primary Examiner* — Clemence Han
(74) *Attorney, Agent, or Firm* — Swernofsky Law Group PC

(57) ABSTRACT

A network monitoring system includes devices receiving network traffic information, and generating at least partial results relating to network symptoms. Those partial results are forwarded to devices processing those partial results and generating information relating to problems in response to those symptoms. Problems are reported to users or sent as notifications. In one embodiment, information relating to network traffic is monitored both by a first set of devices associated with source addresses for that network traffic and a second set of devices associated with destination addresses for that network traffic. Information received by that first set of devices includes information relating to both the source address and destination address of network traffic. That first set of devices processes information relating to the source address of network traffic and forwards information relating to the destination address of network traffic to that second set of devices.

9 Claims, 3 Drawing Sheets

U.S. PATENT DOCUMENTS

| | | | |
|---|---|---|---|
| 5,233,604 | A | 8/1993 | Ahmadi et al. |
| 5,442,750 | A | 8/1995 | Harriman et al. |
| 5,958,053 | A | 9/1999 | Denker |
| 5,970,064 | A | 10/1999 | Clark et al. |
| 6,046,979 | A | 4/2000 | Bauman |
| 6,076,115 | A | 6/2000 | Sambamurthy et al. |
| 6,115,745 | A | 9/2000 | Berstis et al. |
| 6,167,025 | A | 12/2000 | Hsing et al. |
| 6,189,035 | B1 | 2/2001 | Lockhart et al. |
| 6,202,084 | B1 | 3/2001 | Kumar et al. |
| 6,314,093 | B1 | 11/2001 | Mann et al. |
| 6,314,464 | B1 | 11/2001 | Murata et al. |
| 6,347,339 | B1 | 2/2002 | Morris et al. |
| 6,502,135 | B1 | 12/2002 | Minger et al. |
| 6,725,377 | B1 | 4/2004 | Kouznetsov |
| 6,757,742 | B1 * | 6/2004 | Viswanath ............... 709/246 |
| 6,785,237 | B1 * | 8/2004 | Sufleta ................... 370/236 |
| 6,789,190 | B1 | 9/2004 | Cohen |
| 6,816,910 | B1 | 11/2004 | Riciulli |
| 6,930,978 | B2 | 8/2005 | Sharp et al. |
| 6,973,040 | B1 | 12/2005 | Ricciulli |
| 7,013,482 | B1 | 3/2006 | Krumel |
| 7,051,369 | B1 | 5/2006 | Baba |
| 7,062,782 | B1 | 6/2006 | Stone et al. |
| 7,076,547 | B1 * | 7/2006 | Black ..................... 709/224 |
| 7,089,428 | B2 | 8/2006 | Farley et al. |
| 7,260,840 | B2 | 8/2007 | Swander et al. |
| 7,331,060 | B1 | 2/2008 | Ricciulli |
| 7,386,888 | B2 | 6/2008 | Liang et al. |
| 7,461,403 | B1 | 12/2008 | Libenzi et al. |
| 2001/0049711 | A1 | 12/2001 | Nishihara |
| 2003/0229485 | A1 | 12/2003 | Nishikawa et al. |
| 2003/0229692 | A1 * | 12/2003 | Vo ........................ 709/224 |
| 2004/0054925 | A1 | 3/2004 | Etheridge et al. |
| 2005/0213504 | A1 | 9/2005 | Enomoto |
| 2005/0278779 | A1 | 12/2005 | Koppol et al. |
| 2006/0109793 | A1 * | 5/2006 | Kim et al. ............... 370/250 |
| 2007/0195787 | A1 * | 8/2007 | Alnuweiri et al. ......... 370/395.4 |
| 2007/0211697 | A1 * | 9/2007 | Noble .................... 370/352 |
| 2009/0046664 | A1 | 2/2009 | Aso |

OTHER PUBLICATIONS

Steinke. "IP Addresses and Subnet Masks," Network Magazine, Oct. 1995, pp. 1-3, Tables 1 and 3, <http://www.networkmagazine.com/shared/printableArticle.jhtml?articleID=17601068>.

* cited by examiner

PARALLEL DISTRIBUTED NETWORK MONITORING

CROSS-REFERENCE TO RELATED DOCUMENTS

This application claims priority of the following related documents:

U.S. patent application 60/962,181, filed Jul. 25 2007, titled "Parallel Distributed Network Monitoring", Express Mail mailing number EV 875 991 898 US.

U.S. patent application 60/962,295, filed Jul. 25, 2007, titled "Network Monitoring Using Virtual Packets", Express Mail mailing number EV 875 991 884 US.

U.S. patent application 60/962,182, filed Jul. 25, 2007, titled "Network Monitoring Using Bounded Memory Data Structures", Express Mail mailing number EV 875 991 875 US.

Each of these documents is hereby incorporated by reference as if fully set forth herein.

BACKGROUND

One known problem is when monitoring network traffic for a relatively large network, the amount of information relating to that network traffic can also be relatively large, with the effect that it might become difficult for a network monitoring device to keep up with that relatively large amount of information.

SUMMARY OF THE DESCRIPTION

A network monitoring system includes a plurality of network monitoring devices for receiving information relating to network traffic, and for generating at least partial results relating to symptoms of possible problems that might be identified or reported with respect to that network. Those partial results are forwarded to network monitoring devices for processing those partial results and generating information relating to problems in response to those symptoms. Information relating to problems can be reported to users or sent as notifications to interested parties.

In one embodiment, information relating to network traffic is monitored both by a first set of devices associated with source addresses for that network traffic and a second set of devices associated with destination addresses for that network traffic, i.e., each flow is observed both with respect to its source address and with respect to its destination address. Information received by that first set of devices includes information relating to both the source address and destination address of network traffic. That first set of devices processes information relating to the source address of network traffic and forwards information relating to the destination address of network traffic to that second set of devices.

DESCRIPTION

Nature of the Description

Read this application in its most general form. This includes, without limitation:

References to specific structures or techniques include alternative or more general structures or techniques, especially when discussing aspects of the invention, or how the invention might be made or used.

References to "preferred" structures or techniques generally mean that the inventor contemplates using those structures are techniques, and think they are best for the intended application. This does not exclude other structures or techniques for the invention, and does not mean that the preferred structures or techniques would necessarily be preferred in all circumstances.

References to first contemplated causes or effects for some implementations do not preclude other causes or effects that might occur in other implementations, even if completely contrary, where circumstances would indicate that the first contemplated causes or effects would not be as determinative of the structures or techniques to be selected for actual use.

References to first reasons for using particular structures or techniques do not preclude other reasons or other structures or techniques, even if completely contrary, where circumstances would indicate that the first structures or techniques are not as compelling. The invention includes those other reasons or other structures or techniques, especially where circumstances would indicate they would achieve the same effect or purpose as the first reasons, structures, or techniques.

Terms and Phrases

Read this application with the following terms and phrases in their most general form. The general meaning of each of these terms or phrases is illustrative, not in any way limiting.

The phrase "network monitoring system" generally refers to any apparatus or method by which information relating to network traffic is identified or reported.

The phrase "network monitoring device" generally refers to any apparatus included in a network monitoring system.

The phrase "network traffic" generally refers to any information relating to communication in a network of processing devices.

The term "symptoms" generally refers to any information relating to activity of a network of processing devices.

The term "problems" generally refers to any information relating to actual or suspected conditions or status of a network of processing devices.

The phrase "source address" generally refers to information describing the source of a communication in a network processing devices. The phrase "destination address" generally refers to destination of a communication in a network processing devices.

Figures and Text

FIG. 1

Figure 1:
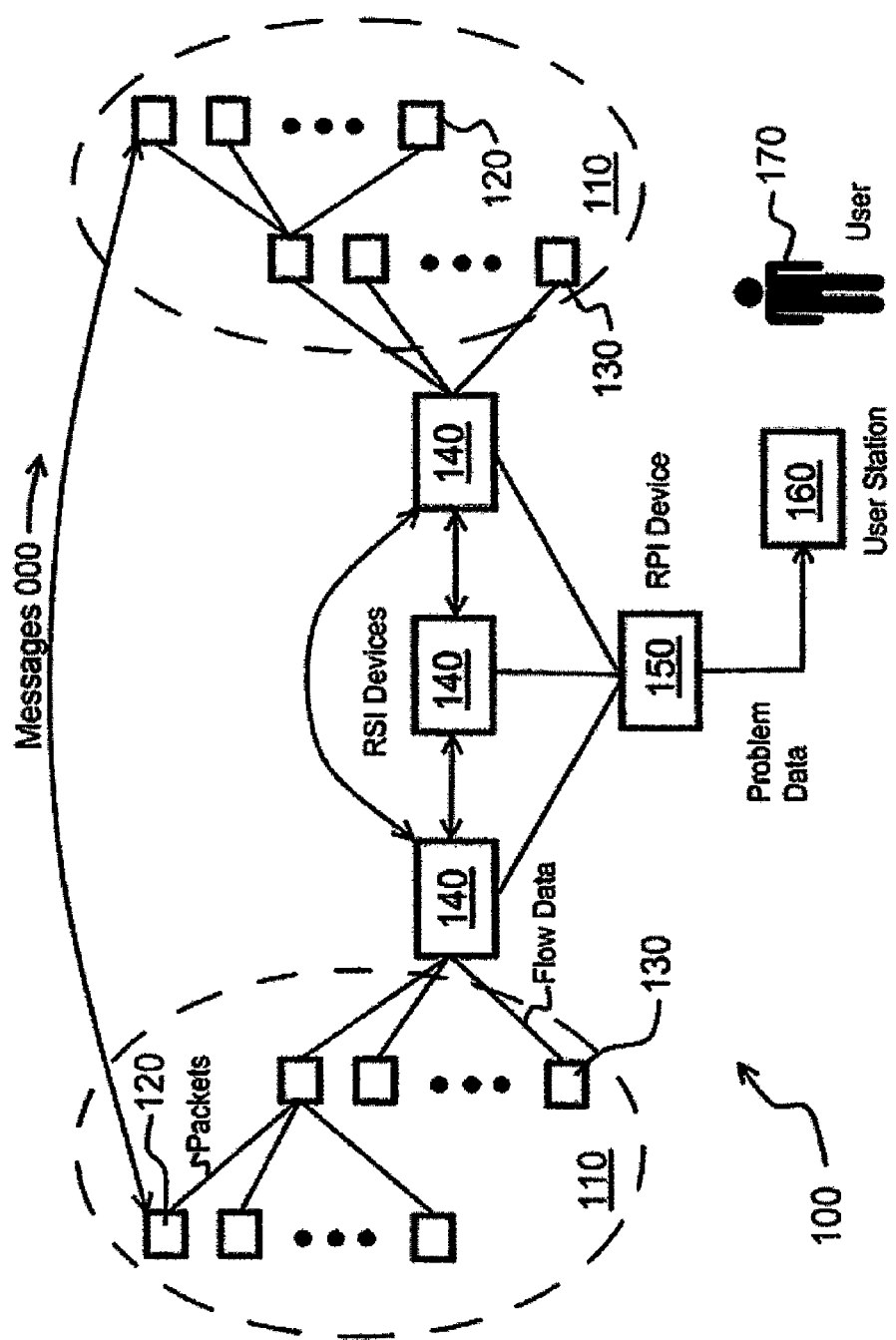
FIG. 1 shows a block diagram of a system.

A FIG. 1 shows a block diagram of a system.

A system 100 includes elements as shown in the FIG. 1, including at least: a communication network 110, a set of endpoints 120 included in or coupled to that communication network, a set of traffic reporting devices 130 included in or coupled to that communication network, a set of symptom identification devices 140 coupled to that communication network, at least one problem identification device 150 coupled to that communication network, and (optionally) a user station 160 operated by a user 170.

The communication network 110 might include any form of communication pathway, such as for example, a broadcast or narrowcast network, a bus or crossbar switch or other substantially internal communications path in a computing device, a LAN or WAN, a set of external devices disposed for cluster computing or other distributed computing, an enterprise network or Internet or intranet, or otherwise.

The endpoints 120 might include any form of processing or storage device capable of sending or receiving information using that communication network 110. In one embodiment, the endpoints 120 include at least the capability for sending or receiving messages, also sometimes called "packets", using that communication network 110. In one embodiment, each packet includes at least a source address, a source port identifier, a destination address, a destination port identifier, and payload information.

The traffic reporting devices 130 might include any form of device capable of identifying network traffic and generating information regarding that network traffic. In one embodiment, the traffic reporting devices 130 include routing devices, also capable of sending and receiving messages to and from the endpoints 120 and other routing devices, which collect flow information regarding network "flows" and report that flow information according to known flow information reporting protocols.

The symptom identification devices 140 might include any form of device capable of receiving flow information and generating information relating to symptoms, i.e., information relating to activity of that communication network 110. The symptom identification devices 140 are described in other detail with respect to the FIG. 2.

The problem identification device 150 might include any form of device capable of receiving information relating to symptoms and generating information relating to problems, i.e., information relating to actual or suspected conditions or status of that communication network 110. The problem identification device 150 is described in other detail with respect to the FIG. 3.

The user station 160 might include any form of device capable of communicating with a user interface server (as described below) and under control of one or more users 170.

FIG. 2

Figure 2:
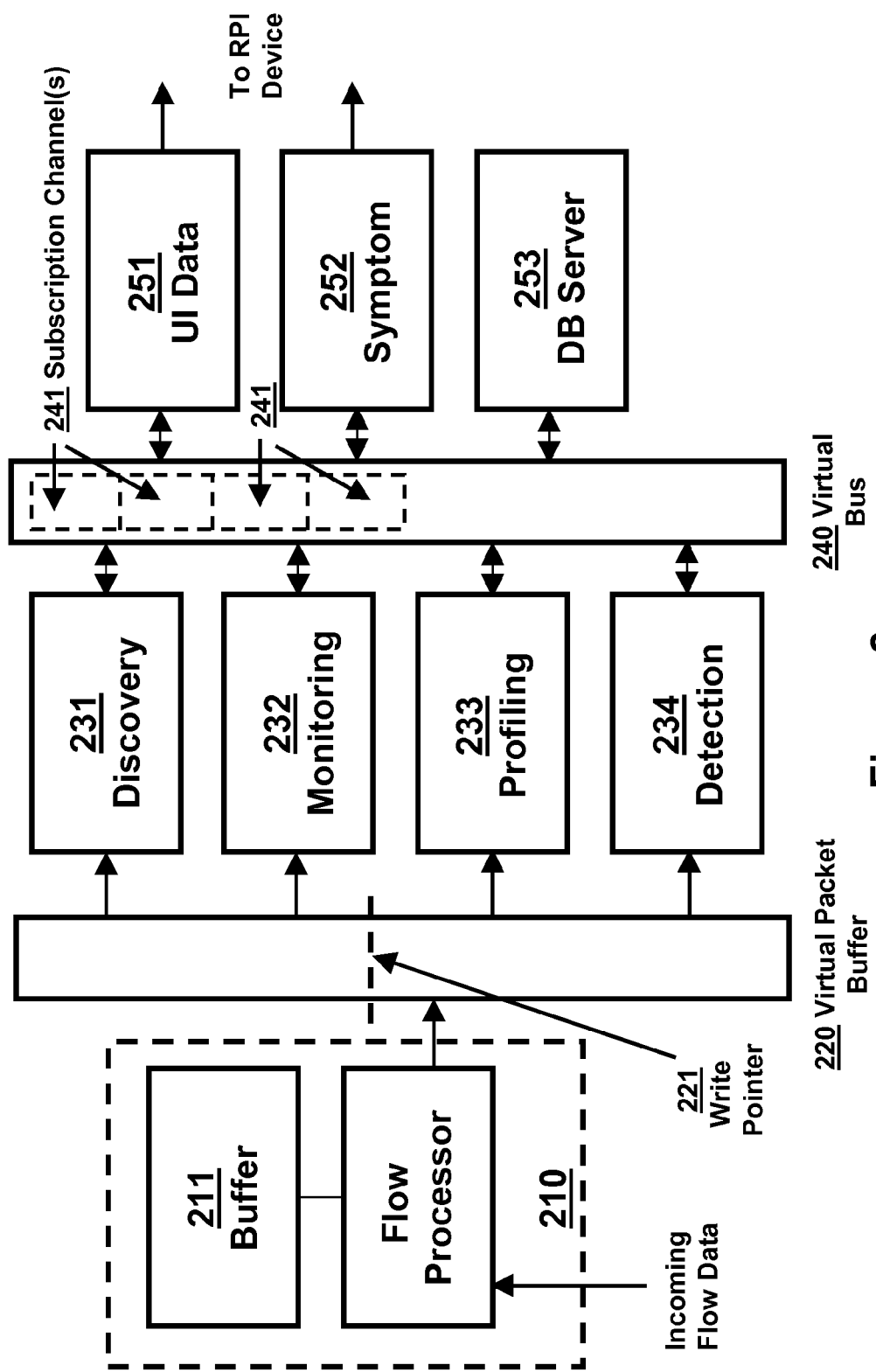
FIG. 2 shows a block diagram of a symptom identification device.

A FIG. 2 shows a block diagram of a symptom identification device 140.

A symptom identification device 140 includes elements as shown in the FIG. 2, including at least: a flow processor 210, a virtual packet buffer 220, a discovery engine 231, a monitoring engine 232, a profiling engine 233, a detection engine 234, a virtual bus 240, a UI (user interface) data generator 251, a symptom data generator 252, and a database server 253.

The flow processor 210 includes any form of processing device capable of receiving flow information. Upon receiving a message including flow information, the flow processor 210 parses that flow information, determines a start time and an end time for that flow information, and determines a number of packets reported by the traffic reporting device 130 that provided that flow information. The flow processor 210 generates a sequence of virtual packets, each representing one or more real packets, but differing from real packets in that (1) virtual packets do not include any payload information, and (2) virtual packets are generated to be equally distributed over the time reported for the flow information, rather than the possible unequal distribution that real packets might have manifested.

The flow processor 210 includes a virtual packet reordering buffer 211, in which it assures that virtual packets are properly ordered with respect to their (generated) arrival time. As the flow processor 210 receives flow information, the flow processor 210 continues to generate new virtual packets and to place those new virtual packets in the reordering buffer 211 so that all virtual packets remain in time order within the reordering buffer 211. Virtual packets older than a selected time duration (in a preferred embodiment, 60 seconds) are forwarded from the reordering buffer 211 to the virtual packet buffer 220.

The virtual packet buffer 220 includes a sequence of virtual packets, ordered with respect to their time of arrival, generated by the flow processor 210 and written by the flow processor 210 into the virtual packet buffer 220. A write pointer 221 is maintained to show where the flow processor 210 is presently writing to the virtual packet buffer 220. Those other elements of the symptom identification device 140 that are coupled to the virtual packet buffer 220, including the discovery engine 231, the monitoring engine 232, the profiling engine 233, and the detection engine 234, read from the virtual packet buffer 220, each maintaining its own read pointer to where they are presently reading from the virtual packet buffer 220. If any of the elements of the symptom identification device 140 that are coupled to the virtual packet buffer 220 catch up with the write pointer 221, they wait until the flow processor 210 has written new information into the virtual packet buffer 220 and updated the write pointer 221.

The discovery engine 231 reads virtual packets from the virtual packet buffer 220, and generates discovery information relating to identification of endpoints 120 and of the applications they use.

The monitoring engine 232 receives discovery information from the discovery engine 231, reads virtual packets from the virtual packet buffer 220, and generates monitoring information relating to activity of endpoints 120 and applications in the communication network 110.

The profiling engine 233 receives monitoring information from the monitoring engine 232, reads virtual packets from the virtual packet buffer 220, and generates profiling information relating to activity of endpoints 120 and applications in the communication network 110.

The detection engine 234 receives profiling information from the profiling engine 233, and generates symptom information relating to activity of endpoints 120 and applications in the communication network 110.

The virtual bus 240 provides for communication among elements of the symptom identification device 140, including the discovery engine 231, the monitoring engine 232, the profiling engine 233, the detection engine 234, the UI data generator 251, the symptom data generator 252, and the database server 253. The virtual bus 240 includes a set of subscription channels 241, each including information posted to those subscription channels 241 by one or more elements of the symptom identification device 140 coupled to the virtual bus 240, and each readable by one or more elements of the symptom identification device 140 coupled to the virtual bus 240.

In one embodiment, the virtual bus 240 includes a process disposed to receive messages from each of those elements of the symptom identification device 140. Those messages might indicate either information to post to a selected subscription channel 241, or a request to receive information from a selected subscription channel 241. In the former case, the virtual bus 240 process records that information in association with the selected subscription channel 241. In the latter case, the virtual bus 240 process, from time to time, retrieves information associated with the selected subscription channel 241 and sends that information to the requesting element, until such time as that requesting element asks the virtual bus 240 process to remove it from the selected subscription channel 241.

The UI data generator 251 receives information from the virtual bus 240, subscribing to that information needed by the problem identification device 150 for its UI server 331 (as described below), and forwards that information to the problem identification device 150.

The symptom data generator 252 receives information from the virtual bus 240, subscribing to that information needed by the problem identification device 150 for its correlation engine 333 (as described below), and forwards that information to the problem identification device 150.

The database server 253 maintains a database of information for use by elements of the symptom identification device 140.

FIG. 3

Figure 3:
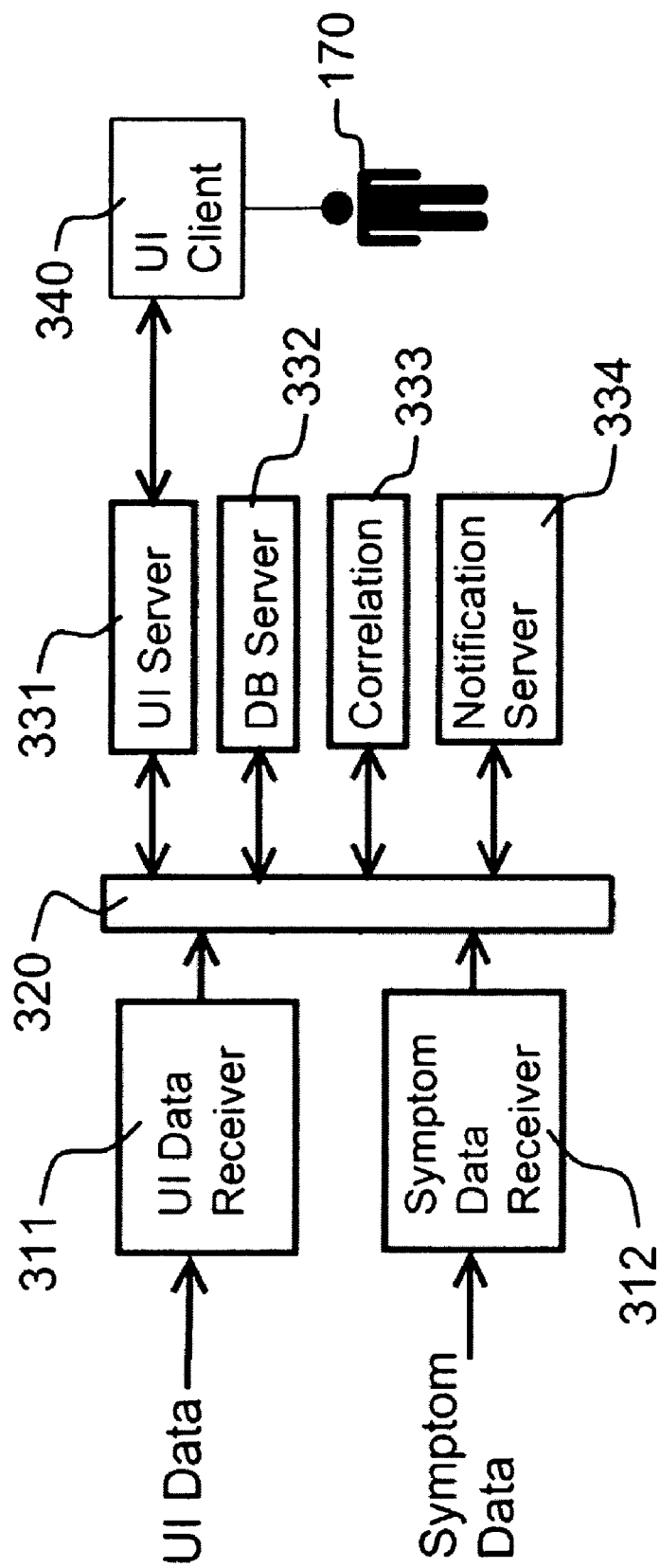
FIG. 3 shows a block diagram of a problem identification device.

A FIG. 3 shows a block diagram of a problem identification device 150.

A problem identification device 150 includes elements as shown in the FIG. 3, including at least: a UI data receiver 311, a symptom data receiver 312, a virtual bus 320, a UI server 331, a database server 332, a correlation engine 333, and a notification server 334. The UI server 331 is capable of coupling to a UI client 340, the latter being under control of one or more users 170.

The UI data receiver 311 receives information from symptom identification devices 140, as generated and forwarded by their UI data generators 251 (as described above), and forwards that information, using the virtual bus 320, to the UI server 331.

The symptom data receiver 312 receives symptom information from symptom identification devices 140, as generated and forwarded by their symptom data generators 252 (as described above), and forwards that information, using the virtual bus 320, to the correlation engine 333.

The virtual bus 320 operates in like manner as the virtual bus 240.

The UI server 331 receives information from the UI data receiver 311, from the symptom data receiver 312, and from the correlation engine 333 (as described below). The UI server 331 generates a set of information for presentation to users 170 using their user stations 160 as UI clients 340. The UI server 331 operates as the server portion of a client-server interactive system, receiving requests from, and making responses to, the UI client 340, with the effect that users 170 might use their user stations 160 as UI clients 340 to receive status information and present commands to the UI server 331.

The database server 332 operates in like mariner as the database server 253, except that maintains a database of information for use by elements of the problem identification device 150.

The correlation engine 333 receives symptom information from the symptom data receiver 312, as generated and forwarded by symptom data generators 252 at symptom identification devices 140. The correlation engine 333 generates information relating to problems affecting the communication network 110, in response to that symptom information, and provides that problem information to the UI server 331 and to the notification server 334, with the effect that it can be communicated to users 170.

The notification server 334 receives information from the correlation engine 333 relating to problems affecting the communication network 110, and forwards that information to any user stations 160 requesting notification. User stations 160 might request notification by sending messages to the problem identification device 150 with attention to its notification server 334. The notification server 334 might send notification to those user stations 160 using email, IM, SMS, or any other form of notification.

The UI clients 340 are directed by users 170 to interact with the UI server 331 as the client portion of a client-server interactive system, making requests to, and receiving responses from, the UI server 331, with the effect that users 170 might use their user stations 160 as UI clients 340 to receive status information and present commands to the UI server 331.

Alternative Embodiments

After reading this application, those skilled in the art will recognize that the invention has wide applicability, and is not limited to the embodiments described herein.

TECHNICAL APPENDIX

This application has a technical appendix including the following documents:

Unpublished document titled "Scalable Performance Using a Distributed Xangall Solution," naming contributors Rangaswamy JAGANNATHAN, Rosanna LEE, Derek SANDERS, Kishor KAKATKAR, and Xiaohong PAN.

Unpublished document titled "Techniques to Improve Performance and Reduce Memory Footprint of a Single-Appliance Xangati Solution," naming contributors Rosanna LEE, Xiaohong PAN, Rangaswamy JAGANNATHAN, Derek SANDERS, and Kishor KAKATKAR.

Each of these documents is hereby incorporated by reference as if fully set forth herein.

The invention claimed is:

1. A method, including steps of receiving a first set of flow information from a first set of flow information generating devices at a first symptom identifying device;

receiving a second set of flow information from a second set of flow information generating devices at a second symptom identifying device;

generating a sequence of virtual packets in response to the first set and the second set of flow information, said sequence including virtual packets that have no payload and are equally distributed over a time reported for either the first set of flow information or the second set of flow information;

generating discovery information in response to the virtual packets, and sending the discovery information to a problem identifying device.

2. A method as in claim 1, including steps of forwarding at least some flow information from the first symptom identifying device to the second symptom identifying device.

3. A method as in claim 2, wherein said forwarded flow information includes at least some information relating to flows to a destination address.

4. A method as in claim 1, including steps of generating symptom information for a set of source endpoints in response to said first set of flow information; and generating symptom information for a set of destination endpoints in response to said second set of flow information.

5. A method as in claim 4, including steps of forwarding at least some flow information from said first symptom identifying device to said second symptom identifying device.

6. A method as in claim 4, including steps of forwarding at least some flow information from said first symptom identifying device to said second symptom identifying device, wherein that forwarded flow information includes at least some information relating to flows to a destination address.

7. A method as in claim 1, wherein said flow information generating devices include at least one router.

8. A method as in claim 1, wherein
said first set of flow information is responsive to one or more real flows.

9. A method as in claim 1, including steps of
ordering said virtual packets in a time order;
wherein
said step of generating discovery information in responsive to a result of said step of ordering.

* * * * *